United States Patent [19]
Klein

[11] Patent Number: 5,552,243
[45] Date of Patent: *Sep. 3, 1996

[54] BIPOLAR ELECTROCHEMICAL BATTERY OF STACKED WAFER CELLS

[75] Inventor: Martin Klein, Brookfield, Conn.

[73] Assignee: Electro Energy, Inc., Danbury, Conn.

[ * ] Notice: The term of this patent shall not extend beyond the expiration date of Pat. No. 5,393,617.

[21] Appl. No.: 392,704

[22] Filed: Feb. 23, 1995

Related U.S. Application Data

[63] Continuation of Ser. No. 134,429, Oct. 8, 1993, Pat. No. 5,393,617.

[51] Int. Cl.⁶ .......................... H01M 10/36; H01M 4/58; H01M 6/48; H01M 10/48
[52] U.S. Cl. ...................... 429/157; 429/82; 429/90; 429/162; 429/178; 429/185; 429/210; 429/218
[58] Field of Search ..................... 429/210, 218, 429/156, 153, 185, 162, 157, 82, 90, 59, 178

[56] References Cited

U.S. PATENT DOCUMENTS

| | | | |
|---|---|---|---|
| 3,898,099 | 8/1975 | Baker et al. | 136/75 |
| 4,098,965 | 7/1978 | Klasman | 429/153 |
| 4,098,967 | 7/1978 | Biddick et al. | 429/210 |
| 4,312,928 | 1/1982 | Van Deutekom | 429/27 |
| 4,487,817 | 12/1984 | Williams et al. | 429/27 |
| 4,728,586 | 3/1988 | Venkatesan et al. | 429/94 |
| 4,844,999 | 7/1989 | Oshitani et al. | 429/223 |
| 5,234,779 | 8/1993 | Mix et al. | 429/210 X |
| 5,374,490 | 12/1994 | Aldecoa | 429/152 |

FOREIGN PATENT DOCUMENTS 917219  1/1963  United Kingdom.

*Primary Examiner*—John S. Maples
*Attorney, Agent, or Firm*—Kenyon & Kenyon

[57] ABSTRACT

The subject invention relates to electrode structures that are adaptable for primary and electrically rechargeable electrochemical wafer cells. A flat wafer cell is disclosed that includes conductive, carbon-filled polymeric outer layers that serve as electrode contacts and as a means of containment of the cell. Multi-cell, higher voltage batteries may be constructed by stacking individual cells. Specially formulated electrodes and processing techniques that are compatible with the wafer cell construction are disclosed for a nickel-metal hydride battery system. The cell design and electrode formulations provide for individual operation of a vented or low pressure sealed cell and/or for operation of these cells in a stacked array in an outer battery housing.

31 Claims, 14 Drawing Sheets

BIPOLAR ELECTROCHEMICAL BATTERY OF STACKED WAFER CELLS

This invention was made with Government support under contract F33615-92-C-2258 awarded by the Department of the Air Force, Air Force Systems Command. The Government has certain rights in the invention.

This application is a continuation of application Ser. No. 08/134,429, filed on Oct. 8, 1993, now U.S. Pat. No. 5,393,617.

FIELD OF THE INVENTION

The present invention relates to a packaging method, electrode formulations, and fabrication techniques for making electrochemical cells and multi-cell batteries. In particular, this invention relates to electrochemical cell constructions useful for rechargeable bipolar battery structures that have a high energy storage capacity and that are capable of many recharging cycles without substantial deterioration of the battery's performance. More specifically, this invention relates to flat nickel and metal hydride electrode structures and methods of making nickel and flat metal hydride electrode structures that are capable of being stacked in a multi-cell battery construction.

BACKGROUND OF THE INVENTION

Multi-cell batteries that are constructed in a broad range of electrochemical systems are typically packaged in cylindrical or prismatic housings. Individual cells are connected in series by conductive links to make the multi-cell batteries. Such construction approaches provide for good sealing of the individual cell compartments and for reliable operation. However, such constructions allocate a large fraction of the multi-cell battery's weight and volume to the packaging and, thus, do not make full use of the potential energy storage capacity of the active components of the cell. For improving battery energy storage capacity on a weight and volume basis, packaging approaches are sought that reduce packaging weight and volume and that provide stable battery performance and low internal resistance. These objectives have led to the pursuit of a bipolar construction in which an electrically conductive bipolar layer serves as the electrical interconnection between adjacent cells as well as a partition between the cells. In order for the bipolar construction to be successfully utilized, the bipolar layer must be sufficiently conductive to transmit current from cell to cell, chemically stable in the cell's environment, capable of making and maintaining good electrical contact to the electrodes and capable of being electrically insulated and sealable around the boundaries of the cell so as to contain electrolyte in the cell. These requirements are more difficult to achieve in rechargeable batteries due to the charging potential that can accelerate corrosion of the bipolar layer and in alkaline batteries due to the creep nature of the electrolyte. Achieving the proper combination of these characteristics has proved very difficult. For maintenance-free operation it is desirable to operate rechargeable batteries in a sealed configuration. However, sealed bipolar designs typically utilize flat electrodes and stacked-cell constructions that are structurally poor for containment of the gases present or generated during cell operation. In a sealed cell construction, gases are generated during charging than need to be chemically recombined within the cell for stable operation. To minimize weight of the structures used to provide the gas pressure containment, the battery should operate at relatively low pressure. The pressure-containment requirement creates additional challenges on designing a stable bipolar configuration.

Despite a number of patents and considerable effort at making a bipolar construction for the lead-acid and nickel-cadmium systems such batteries are not commercially available, (U.S. Pat. No. 4,098,967). Construction of a flat metal hydride battery is even more difficult because many of the metal hydride alloys used to make metal hydride batteries operate at elevated hydrogen pressures.

The bipolar construction has been successfully employed in the flat plate construction of the Leclanche $MnO_2$—$Zn$ system as a primary battery, U.S. Pat. No. 4,098,965. Since a primary battery is non-rechargeable, the materials-stability problem is less severe and the aqueous chloride electrolyte may be contained without unreasonable difficulty.

Another problem of prior art electrochemical cells relates to the material problems encountered with metal hydride electrodes. Electrochemically reversible metal hydride electrodes operate by the absorption of hydrogen in the lattice of the metal hydride alloy during electrochemical charging of the cell. A number of alloy formulations have been identified of the so-called $AB_5$ and $AB_2$ structure that can function in this manner, for example, as disclosed in U.S. Pat. Nos. 4,488,817 and 4,728,586. To insure reasonable rates of reaction and transport of hydrogen, such electrodes may be prepared from alloy powders typically having an average particle size of about 50 microns. Fabricating an electrode structure from the alloy powders may be accomplished by sintering the metal powders or by using polymeric binders. However, conventional techniques do not yield electrodes that make good and stable contact to the cell face of the conductive outer layer in a bipolar construction. Metal hydride alloys can fragment during repeated cycling as the alloy undergoes expansion and contraction each time the hydrogen enters and leaves the lattice. It is also recognized that oxygen and or the electrolyte can react with the hydride alloy and cause deterioration of the hydrogen storage capacity of the hydride alloy.

The present invention provides a method for achieving the packaging benefits of bipolar construction for re-chargeable multi-cell batteries and of overcoming the materials and construction problems of previous approaches. Although the materials of construction for each type of cell are specific to each battery chemistry, the generic bipolar construction disclosed herein may be used for many types of electrochemical cells. In particular, the descriptions and approaches that follow relate specifically to the rechargeable nickel-metal hydride chemistry but may generally be adaptable to other chemistries.

ADVANTAGES AND SUMMARY OF THE INVENTION

An object of the present invention is to provide a bipolar battery construction for rechargeable multi-cell batteries that overcomes the above-cited problems of prior art bipolar constructions.

More specifically, an object of the present invention is to provide bipolar designs that have improved energy storage capacity while still providing stable and efficient battery performance.

Another object of the present invention is to provide bipolar battery constructions using flat electrochemical cells having a sealed configuration.

Still another object of the present invention is to provide bipolar battery constructions wherein metal hydride electrodes may be used.

Yet another object of the present invention is to provide improved metal hydride electrode structures.

Still another object of the present invention is to provide a method of preparing flat metal hydride structures that may be used in rechargeable bipolar battery constructions.

These and still other objects, benefits and advantages may be achieved by making a bipolar electrochemical battery comprising:

a stack of at least two electrochemical cells electrically arranged in series with the positive face of each cell contacting the negative face of the adjacent cell, wherein each of the cells contains
(a) a metal hydride electrode;
(b) a nickel electrode;
(c) a porous separator between the electrodes,
wherein the separator contains an electrolyte;
(d) a first electrically conductive outer layer in electrical contact with the outer face of the metal hydride electrode; and
(e) a second electrically conductive outer layer in electrical contact with the outer face of the nickel electrode; wherein the outer layers are sealed peripherally to an electrically non-conductive polymeric material such as to form a sealed enclosure containing the electrodes, the separator and the electrolyte.

The present invention further relates to a method of making electrodes comprising:

dry mixing a combination of an electrochemically active material and polytetrafluoroethylene particles in a blending mill to form a mixture;

dry rolling the mixture into a thin layer;

dry kneading the thin layer by sequentially folding and rolling the thin layer such that the polytetrafluoroethylene particles form an interconnected network in which the electrochemically active material is embedded;

calendaring the folded and rolled thin layer to form a substantially flat porous sheet; and cutting a substantially flat electrode from the porous sheet.

Further objects and advantages of the subject invention will be apparent to those skilled in the art from the following detailed description of the disclosed bipolar electrochemical battery and the methods for producing bipolar electrochemical batteries, and to the metal hydride electrodes used therein.

DETAILED DESCRIPTION OF THE PREFERRED EMBODIMENTS

While the following description of preferred embodiments of the present invention is intended to provide detailed instructions that would enable one of ordinary skill in the art to practice the invention, the scope of the invention is not to be limited to the scope of the specific product or process details hereinafter provided.

Figure 1:
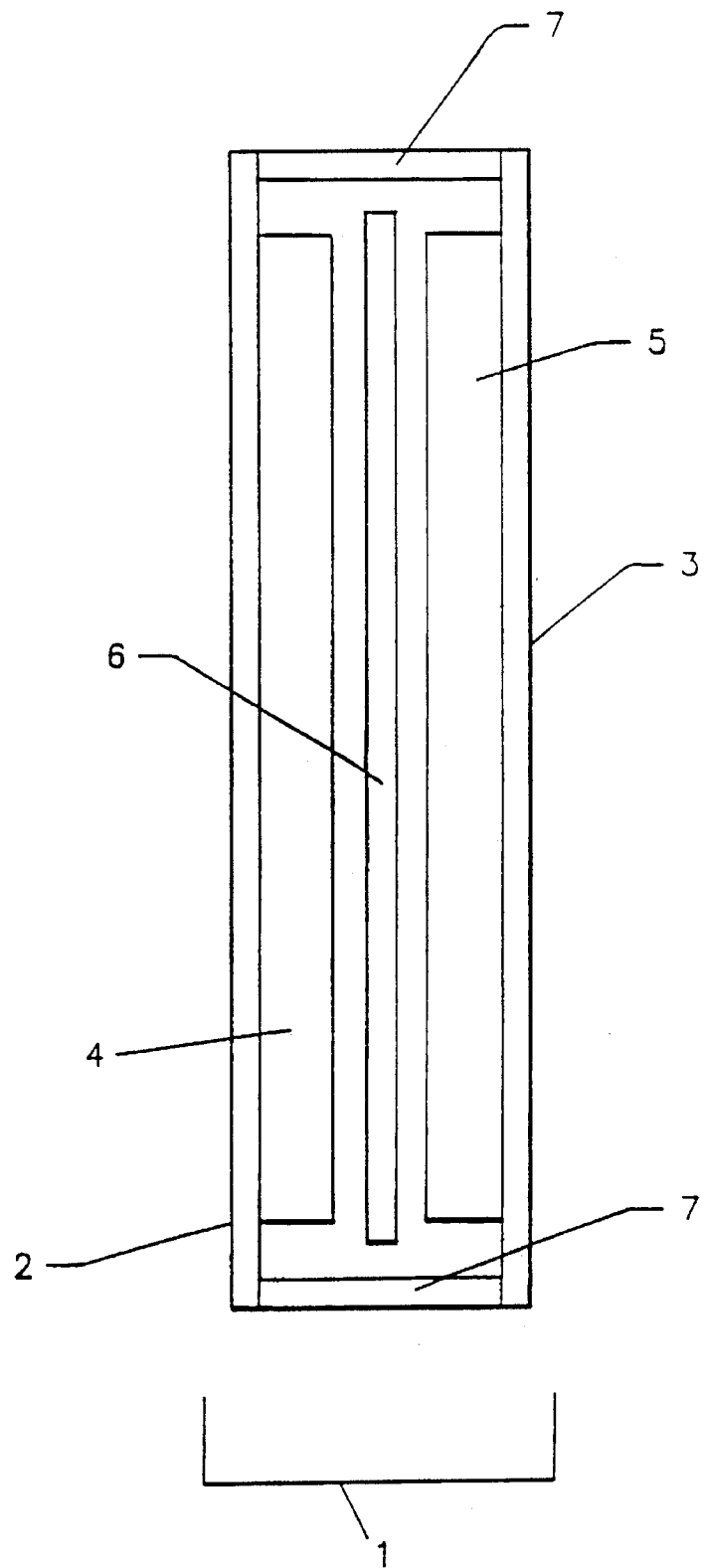
FIG. 1 shows an overview of a wafer cell.

The bipolar electrochemical battery of the subject invention first involves preparing a single electrochemical cell. FIG. 1 shows a schematically illustrative embodiment of a wafer cell 1 comprised of a pair of electrodes contained between two conductive, carbon-filled outer layers 2 and 3 that make electrical contact to the positive and negative electrodes, 4 and 5, respectively. The electrodes are prevented from coming into direct physical electrical contact by a separator 6 that typically is porous so as to contain an electrolyte. The electrolyte typically comprises an aqueous solution of one or more alkali hydroxides such as lithium hydroxide, sodium hydroxide and potassium hydroxide. The separator material typically comprises synthetic resin fibers such as polyamide or polypropylene fibers. In order to enhance the electrical contact, a conductive paste or cement may be used between each of the carbon-filled outer layers and the respective electrode with which it is in contact. In the preferred embodiment of the present invention, the negative electrode 5 is a bonded metal hydride alloy powder that can electrochemically and reversibly store hydrogen. Such alloys may include materials disclosed in U.S. Pat. Nos. 4,487,817 and 4,728,586 but the subject invention is not limited to the formulation of materials disclosed therein. These alloy formulations may include what are commonly referred to as Mischmetal hydride alloys, which may be comprised of an alloy of hydride-forming metals such as $MnNi_{3.5}Co_{0.7}Al_{0.83}$. The positive electrode 4 of the present invention is preferably what is typically referred to as a nickel-type electrode, or more simply, as a nickel electrode. Nickel hydroxide is the active component of a nickel electrode. Prior art nickel electrodes are illustrated in German Patent No. 491,498 and British Patent No. 917,291.

As indicated in FIG. 1, the preferred construction of the present invention comprises an electrochemical cell wherein the electrodes, the separator between the electrodes and the two outer layers are each substantially flat and in tight physical and electrical contact with the adjacent component. The design illustrated in FIG. 1 permits construction of a thin cell that is referred to herein as a wafer cell.

In order for the electrodes, the separator between the electrodes and the electrolyte to be contained within an enclosed wafer cell, the flat outer layers 2 and 3 have a larger physical area than the electrodes, such that each outer layer extends beyond the electrode around the entire perimeter of the adjacent electrode. A non-conductive material 7 may be sealed peripherally to the outer layers to form a border material around the entire perimeter of the electrodes such as to form a sealed enclosure containing the pair of electrodes, the separator and the electrolyte within the wafer cell. The border material is preferably of a polymeric material that may be heat sealed to the outer layers. The polymeric material of the subject invention is preferably a vinyl polymer.

The enclosed wafer cell may be completely sealed or it may be provided with vents for release of excess pressure that may build up in the cell during charging. Since the flat cell construction is a poor physical configuration for a pressure-containment vessel, the use of hydride alloys that operate at atmospheric pressure are preferred. If a completely sealed configuration is used, a design that is electrochemically limited by the capacity of the positive electrode is preferred. For this type of design, oxygen gas is generated at the end of the charging cycle at the positive electrode before the total available hydrogen storage capacity of the hydride electrode is fully utilized. Oxygen produced at the positive electrode may migrate to the negative hydride electrode and chemically recombine with the hydrogen in the hydride electrode so as to help prevent excessive build-up of pressure. The chemical recombination of oxygen and hydrogen is referred to herein as the oxygen recombination reaction.

The present invention further relates, as described in more detail hereinafter, to providing means for enhancing the migration of oxygen gas to the negative electrode and for promoting efficient chemical recombination of the oxygen with hydrogen at the hydride electrode surface. In addition to helping prevent excessive hydrogen buildup, the efficient migration and removal of the oxygen by chemical recombination with hydrogen also helps reduce the tendency for deterioration of the negative hydride electrode by oxidation after many charging cycles.

The separator between the electrodes typically has a porous structure for absorbing and containing the electrolyte within the cell. In a preferred embodiment of the present invention the separator is comprised of two layers of non-woven nylon and the electrolyte is comprised of an alkaline solution. Preferably the alkaline electrolyte is a mixed hydroxide of potassium and lithium hydroxide. The separator extends beyond the edge of the electrodes so as to prevent direct electrical contact between the electrodes.

The individual electrodes each may be connected to current collectors for carrying current between the adjacent cells. Preferably, the current collectors are not necessary since the current path between adjacent electrodes is relatively short and the area of physical and electrical contact between the adjacent cells is large relative to the total area of the adjacent components. In addition, the electrodes are typically conductive enough for cell operation without having current collectors that add weight and complexity to the cell.

Figure 2A:
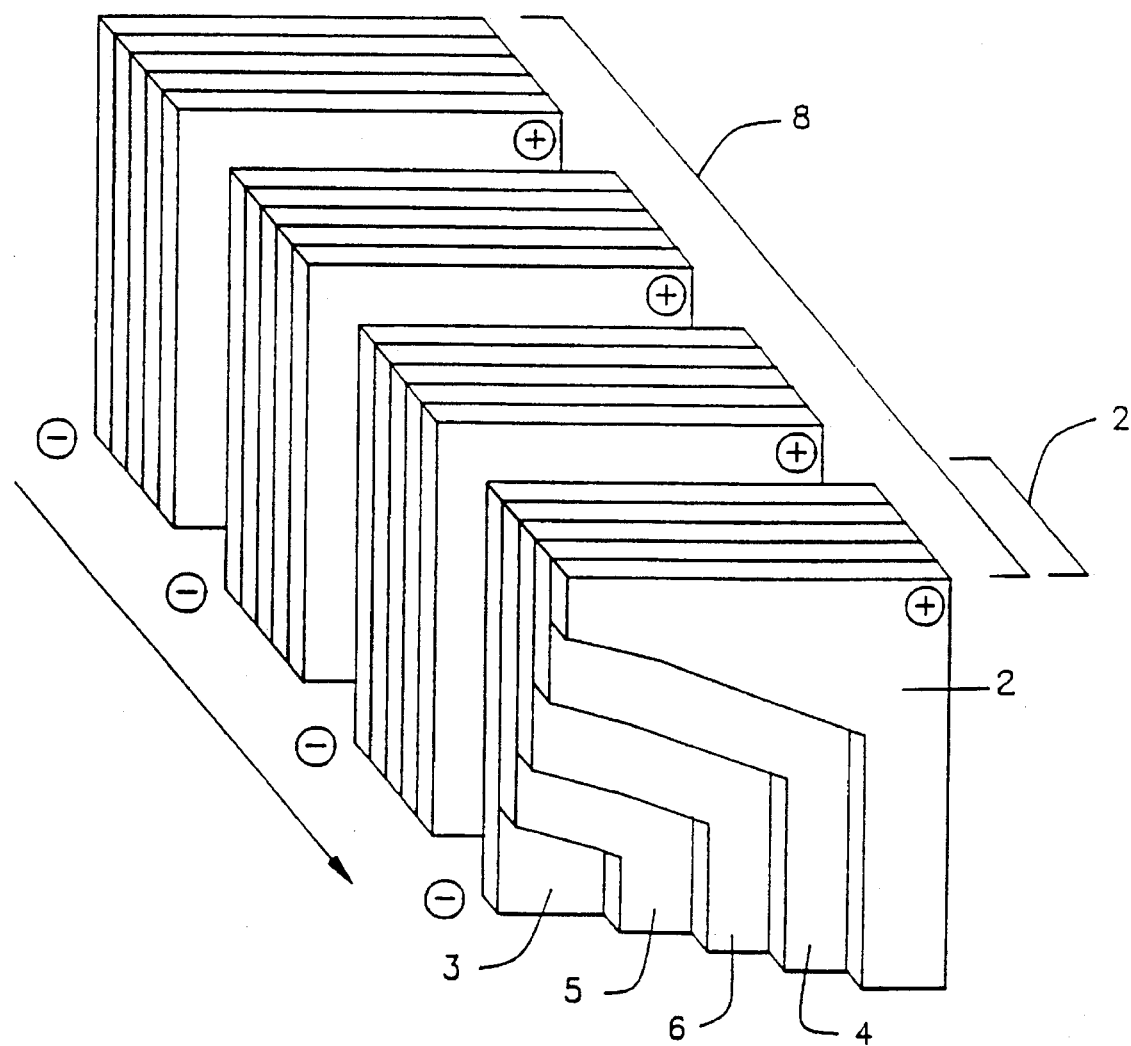
FIG. 2A shows a three-dimensional view of a multi-cell stack of wafer cells and FIG. 2B shows a two-dimensional side view of a multi-cell stack of wafer cells.
Figure 2B:
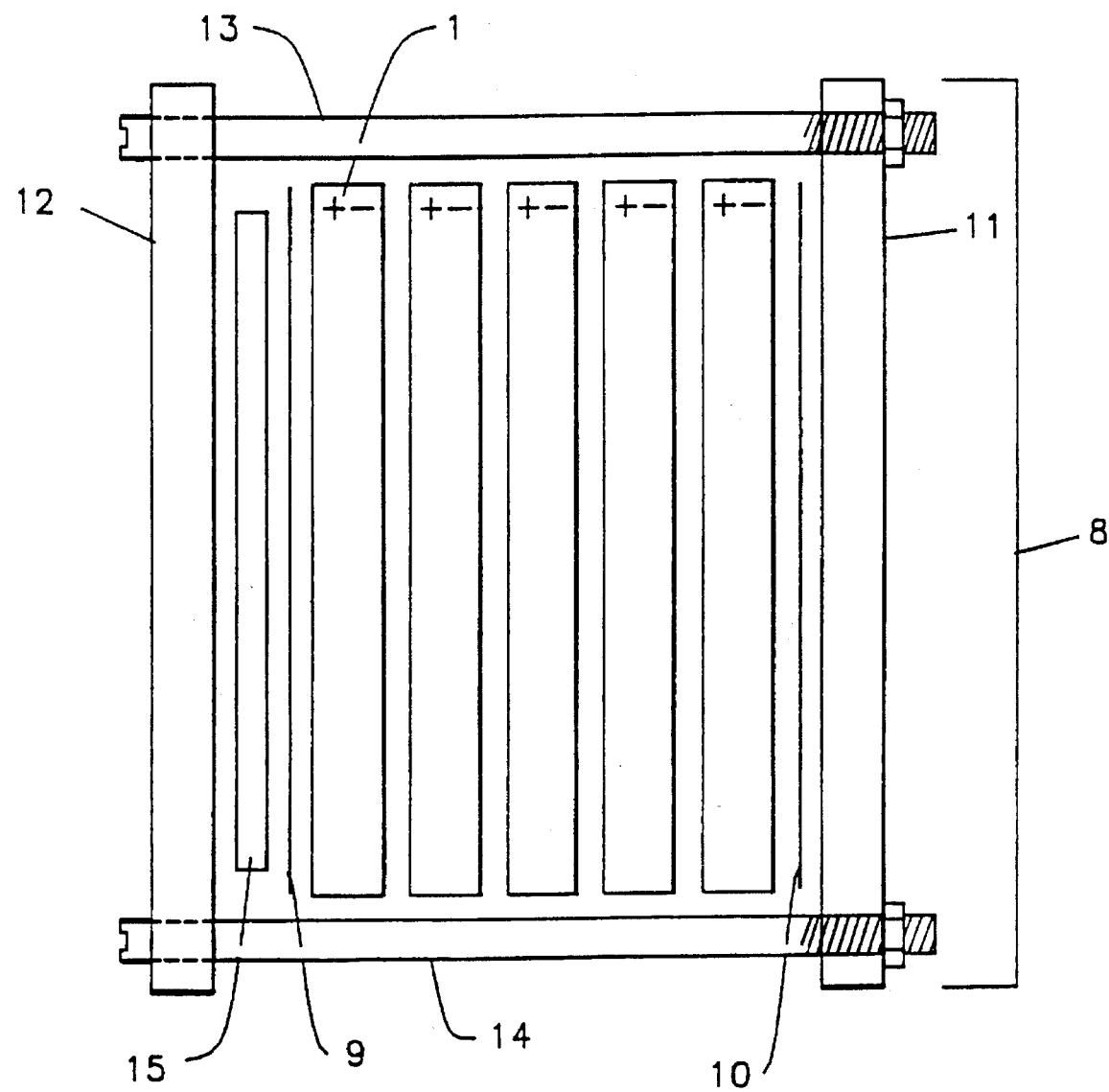
Figure 3:
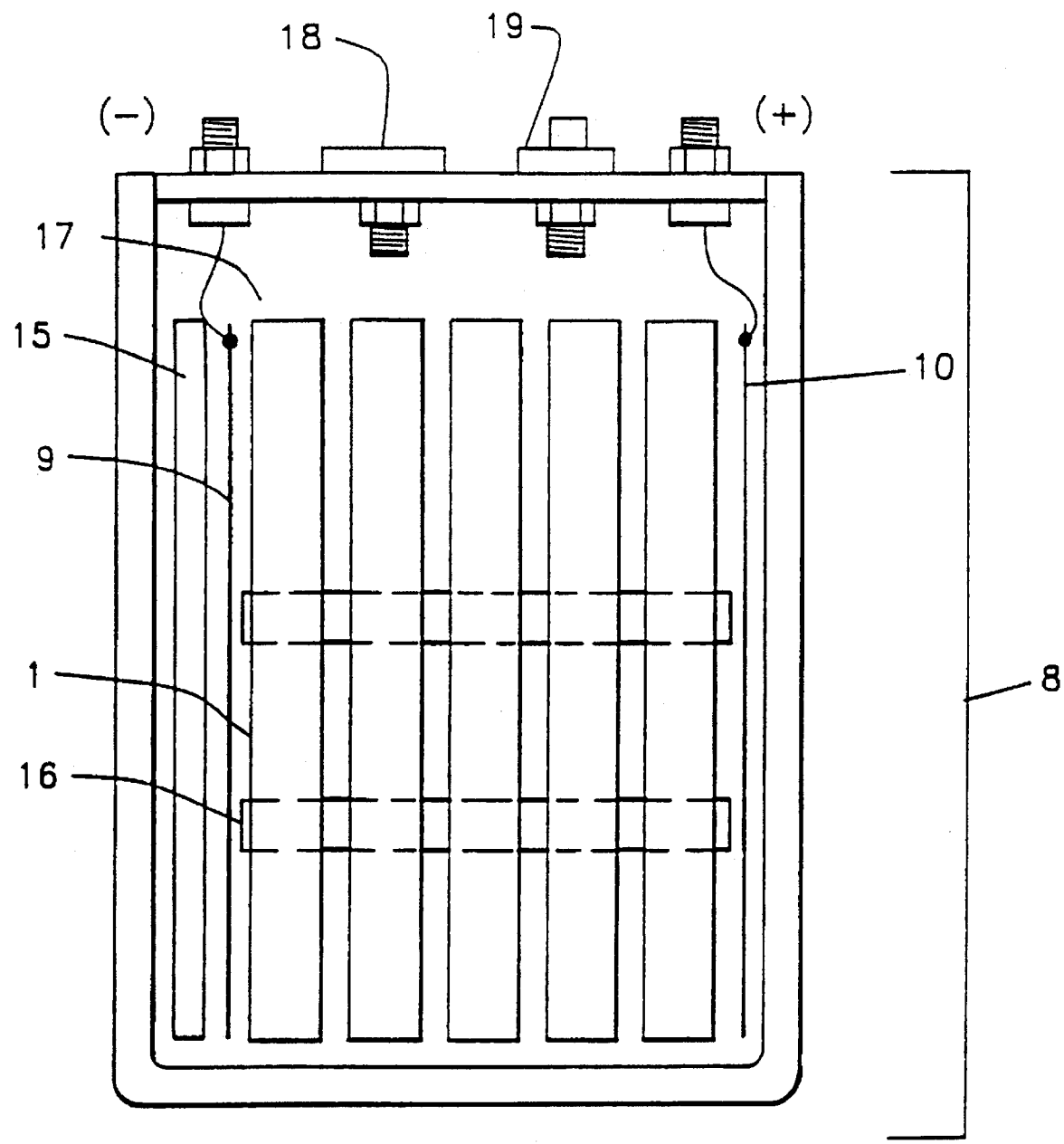
FIG. 3 shows a side view of a sealed battery housing.

FIG. 2A and FIG. 2B show a multi-cell battery 8 made by stacking several wafer cells 1. The wafer cells are electrically arranged in series with the positive face of each cell contacting the negative face of the adjacent cell. The end cells have metal foil contacts, 9 and 10, respectively, to conduct the electric current from the battery stack to the battery terminals. The cell-to-cell contact or the contact between the end cells and the metal foil contacts may be enhanced by use of a conductive paste or cement. The compact stack assembly is held in compression to insure uniform physical contact between the adjacent cells and between the respective layers within each cell. The stack compression can be achieved by means of ridged end plates 11 and 12 having external tie rods 13 and 14 wrapped around the perimeter of the stack, as shown in FIG. 2B, or by having internal tie rods 16, as shown in FIG. 3, that penetrate through sealed holes provided in the individual electrochemical cells. The holes are sealed such as to prevent electrical contact between the tie rods and the electrically conductive components of the cell.

Alternatively, the stack may be contained in an outer battery housing that serves as the battery housing 8. To allow for electrode expansion and irregularities in the stack, the stack may be held in compression by means of a layer of sponge rubber 15 between one or both of the metal foil contacts 9 and 10 and the end plates, 11 and 12, respectively, of the outer housing. FIG. 2B is shown with only one layer of sponge rubber, 15. Alternatively, a spring or a gas-filled compressible pad may be used instead of the sponge rubber. If the cell stack is contained in an enclosed outer housing, the outer housing can serve to provide stack compression and the housing may be sealed or vented.

FIG. 3 shows an embodiment of the invention in which multiple cells each have small vent ports 17 and the cells are contained in a sealed container which serves as the battery housing 8. The battery housing can be provided with a pressure measuring device. Such a device may be a pressure gauge, a transducer and/or a pressure switch 19. The pressure measuring device may be used for monitoring the battery pressure and for regulating the magnitude and duration of the charging current during the charge cycle. Such regulation of the charging current is herein referred to as charge control. The stack may contain internal tie rods 16 to insure uniform compression and contact over the entire plane of the cells. The sealed container may have a pressure relief valve 18 to vent internal gases. The individual wafer cells 1 may be made according to the methods disclosed herein and the remaining components shown in FIG. 3 may be made using known methods or obtained from supply sources known to one skilled in the art.

Figure 4:
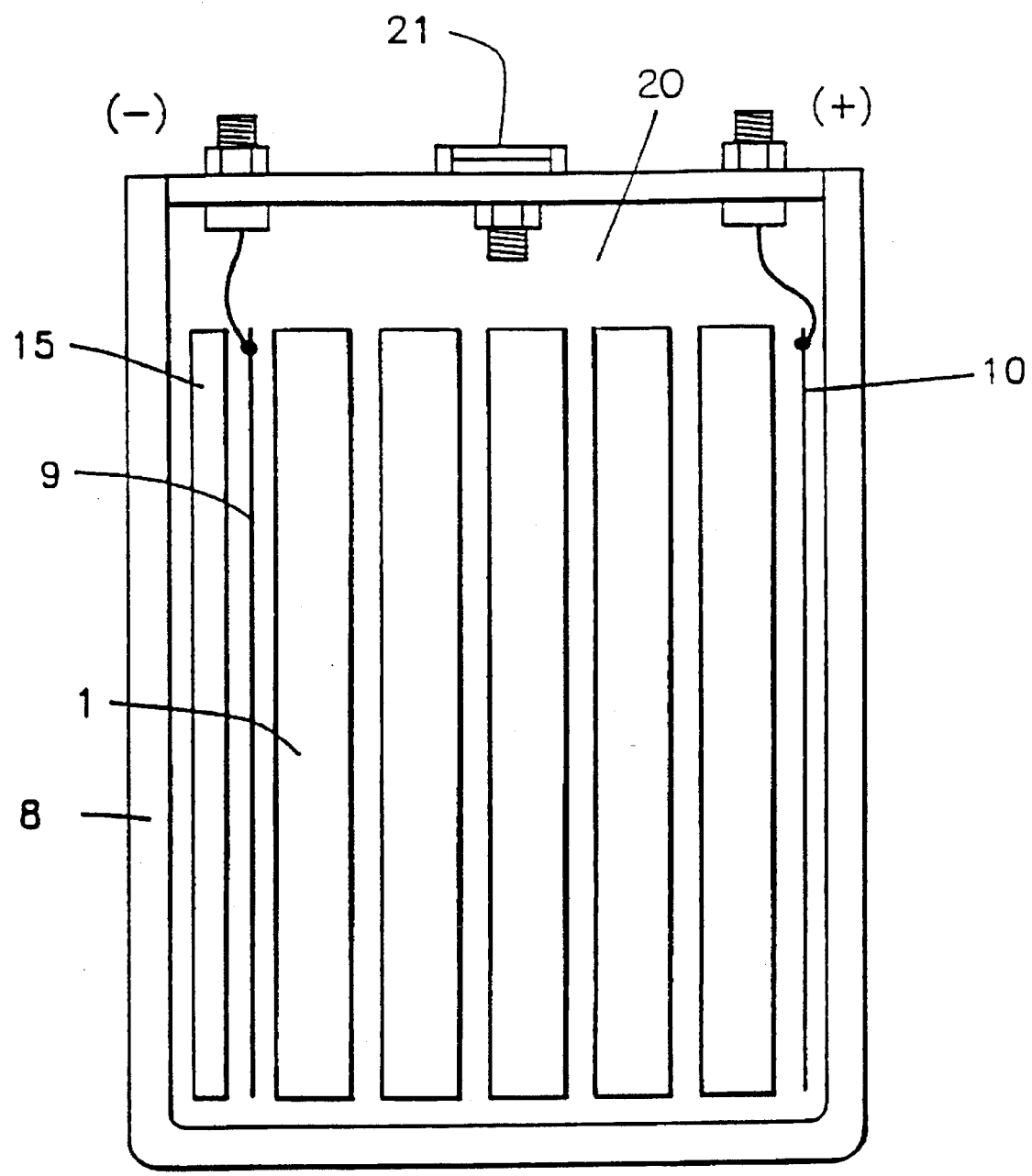
FIG. 4 shows a side view of a sealed battery housing containing a hydraulic fluid.

FIG. 4 shows a similar arrangement as above in which the individual cells are sealed in an outer housing 8 and the void space around the cells is filled with an electrically non-conductive fluid 20. The fluid may be one of many different hydraulic fluids that are known and available. The outer housing contains a pressure switch and/or a pressure indicator 21. If gas pressure is generated within any cell, the cell envelope expands slightly and exerts pressure on the fluid. Since the fluid is non-compressible, the pressure is transmitted to the pressure switch which can be used for charge control. This technique provides for individual sealed cell operation and allows for the first cell that generates pressure to control the battery charge. This avoids reaching an excessive pressure in any cell and eliminates formation of a gas or a liquid interface between individual cells during operation.

Figure 5:
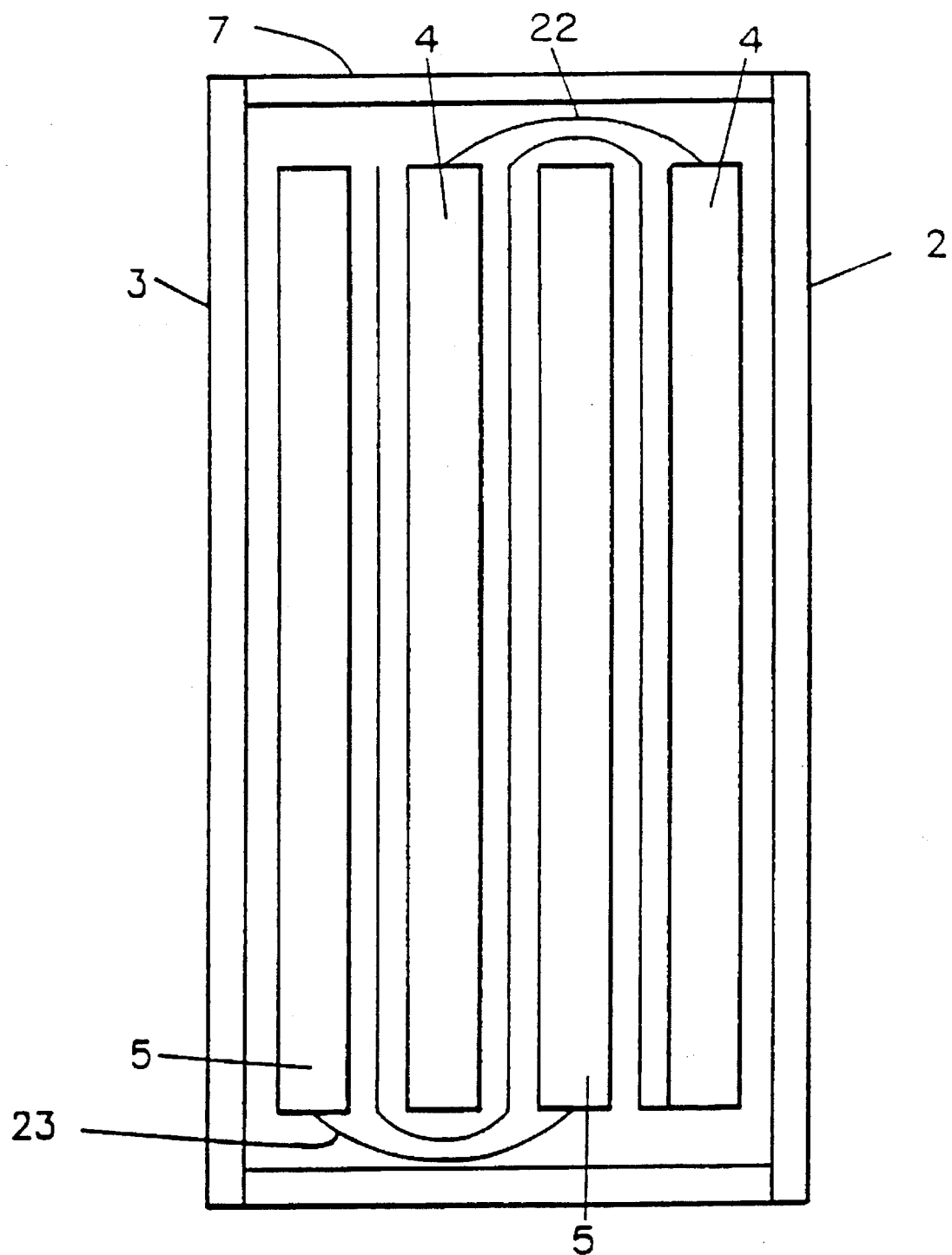
FIG. 5 shows a side view of a multi-electrode configuration in a single wafer cell.

FIG. 5 shows an embodiment of a single wafer cell that contains multiple electrodes to increase cell capacity and/or electrode area. In this case the positive and negative electrodes, 4 and 5, respectively, contain current collectors, 22 and 23, respectively, which are folded to provide electrical contact with the entire surface of each electrode.

Figure 6:
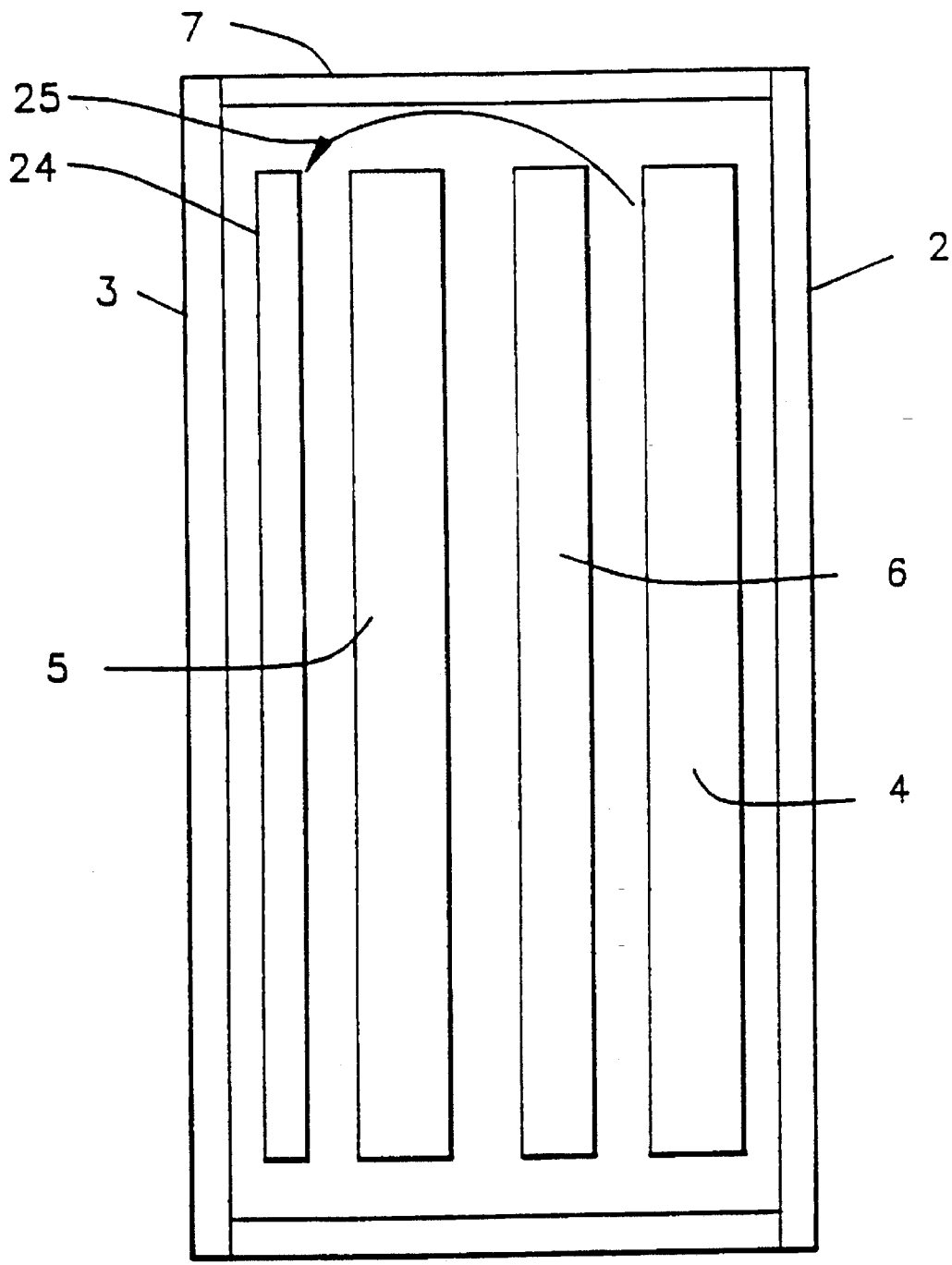
FIG. 6 shows a wafer cell having a back side oxygen recombination arrangement.

FIG. 6 shows an embodiment of a single wafer cell having an improved means for chemically recombining the oxygen gas produced during sealed cell operation. In this case, there is a porous spacer 24 between the back side of the hydride electrode and the conductive, carbon-filled outer layer. The spacer is electrically conductive so as to provide electrical contact of the electrode with the cell face. Preferably, the spacer is porous graphite paper. This back side recombination configuration provides a path 25 for migration of oxygen to the back side of the hydride electrode where it can recombine with the hydrogen. The back side of the hydride electrode can be wet proofed and/or provided with a catalyst to enhance oxygen recombination. Wet proofing may be carried out using known methods for increasing the hydrophobic nature of the surface. The catalysts may be selected from those known to enhance the oxygen recombination reaction. The porous spacer can also be wet proofed and/or provided with a catalyst to enhance the recombination reaction. These approaches can increase the rate of cell overcharge and keep the cell pressure at acceptable levels during overcharge. The back side recombination configuration allows for use of dense separator materials and an increased quantity of electrolyte in the separator since the oxygen generated during overcharge has an alternative path to reach the negative electrode and thereby prevent excessive oxygen build-up.

Another important aspect of the subject invention relates to a method for the fabrication of electrodes and to techniques for insuring good electrical contact of the active electrodes with the conductive cell faces of the wafer cell and with the electrolyte. In particular, an electrode fabrication method is herein disclosed in which an electrochemically active material is held together with a fibrous lace-like network of a polymeric binder. The term "electrochemically active material" is a term that would be readily understood by one of ordinary skill in the art. In particular, the term relates to materials that may be used as the active component in an electrode of an electrochemical cell. Such materials typically comprise a metal or a metal-containing material that readily participates in an electrochemical reaction. For example, for alkaline storage batteries, the electrochemically active material used in the positive electrode may be made from the oxides or hydroxides of nickel, silver, manganese, copper or mercury, and from oxygen. The electrochemically active material used in the negative electrode of an alkaline storage battery may be fabricated from various geometric forms of cadmium, iron or zinc and from hydrogen. Preferably, the electrochemically active material of the negative electrode of the subject invention comprises a metal hydride alloy powder. Metal hydride alloy powders are well known in the art and such powders are readily available from known commercial suppliers. Preferably, the metal hydride powders comprise particles having an average particle size from about 20 to about 50 microns. Most preferably, the metal hydride particles have an average particle size of about 50 microns.

As an example of a preferred embodiment of the subject method, a combination of a metal hydride alloy powder and a powder of the polytetrafluoroethylene polymer known as Teflon® is first dry mixed in a high speed blending mill. The mixture is rolled into a thin layer and the layer is then dry kneaded by sequentially rolling and folding in a shearing action that causes the discrete Teflon® binder particles to fibrillate into a fibrous, lace-like network that has a cohesive structure. The subject invention is directed to the discovery that by sequentially folding and rolling a layer including Teflon® particles, wherein the direction of the folding and rolling is turned about 90 degrees from the direction of the immediately preceding step, a continuously interconnected, fibrous and lace-like strucxture can be produced in a manner such as to form a cohesive structure in which the electrochemically active particles are embedded. The subject invention is specifically directed to the discovery that Teflon® particles are particularly suitable for use in forming this fibrous, lace-like structure. After the mixture is sufficiently worked by the folding and rolling steps, it is then calendared to the desired electrode thickness.

The subject method differs from that described in U.S. Pat. No. 3,898,099 in that the subject method uses Teflon® having a finer particle size and, furthermore, the subject method is a dry method that is accomplished without a lubricating fluid. In particular, the particle size of the Teflon® powder is preferably less than about 20 microns. Using this dry method it is possible to prepare cohesive porous sheets of a metal hydride powder with unexpectedly small quantities of the Teflon® binder in the range, for example, of about 0.5 to about 5 weight percent. This quantity of binder is sufficient to prepare battery electrodes that do not disintegrate during operation. A significant feature of the subject method is that small quantities of binder may be used without the binder completely overcoating the electrochemically active material as happens with other solvent-binder methods. The subject method results in achieving the two competing objectives of providing particles that have good inter-particle contact and of producing particles that are capable of being uniformly wettable with the electrolyte. The subject dry-processing method eliminates the hazard of a working fluid and, thus, eliminates the need to remove the working fluid from the electrode strip before assembly of the electrode in the cell.

Even though this method yields a bonded porous sheet of good structural integrity, metal hydride electrodes fabricated in this manner still perform very poorly due to poor particle-to-particle electric contact as a result of an oxide film that is typically present on hydride powders. It was discovered that incorporation of additive particles such as cupric oxide powder into the mixture can overcome this problem. Although the theory of how the additive particles of cupric oxide improve the cell performance has not been confirmed or proven, it is believed that the improvement is provided in the manner as described below. The scope of the subject invention is, however, not to be limited to the theory hereinafter described.

Cupric oxide is slightly soluble in the alkaline electrolyte used in the cell. By allowing the electrode containing the cupric oxide particles to soak in the electrolyte prior to the first charge cycle, the cupric oxide may enter into solution. During the first charge cycle of the cell the cupric oxide in solution and in the pores of the electrode may be electrochemically reduced and converted to metallic copper. It is believed that the metallic copper deposits on the metal hydride particles throughout the electrode structure as well as on the interface between the electrode layer and the conductive outer layer, such that an interconnected metallic copper layer is produced throughout the electrode structure. If properly and uniformly deposited, the interconnected metallic copper layer would not be expected to retard the metal-hydrogen reaction at the hydride surface, but could create a conductive network that would improve the overall electrical integrity of the electrode structure and, thus, its conductivity. The interconnected metallic copper layer produced in this manner may be formed uniformly throughout the porous electrode structure, but the metallic layer is preferably present only to the extent required to give adequate electrical contact throughout the electrode.

The interconnected metallic-copper layer may also serve as a protective layer to reduce alloy oxidation as well as to enhance the oxygen recombination reaction for sealed cell operation. By enhancing the chemical recombination of hydrogen and oxygen, the incorporation of cupric oxide particles in the electrode, which are converted into an interconnected metallic copper layer, may also assist in balancing the charge of the nickel and the metal hydride electrode for sealed cell operation. Furthermore, the deposited metallic copper layer may also serve as a lower voltage reserve capacity in the metal hydride electrode, if the electrode is discharged completely, thereby avoiding reversal of the metal hydride electrode.

Although the subject method is described in terms of using cupric oxide particles as the additive particles that are believed to be electrochemically converted into an interconnected metallic layer, it is to be understood that other additive particles comprising a material that is capable of being electrochemically converted into a metal layer also fall within the scope of the present invention. The term "additive particles" is herein defined to refer to such particles that are capable of enhancing the electrical contact in the manner described.

Another aspect of the present invention relates to a preparation technique for formulation of the nickel electrode. Nickel electrodes for rechargeable nickel alkaline batteries may be of the sintered, pasted or plastic-bonded type. However, it is necessary that the nickel electrode makes effective and stable contact with the conductive polymeric cell face of the wafer cell. One approach employed herein is, by the dry technique described above, to fabricate a Teflon®-bonded layer from a mixture of nickel hydroxide and graphite and cobalt monoxide and of the Teflon® powder. During the initial electrolyte-soak period a portion of the cobalt monoxide enters into solution and redeposits as a conductive layer at the electrode-conductive polymeric interface. This mechanism is described in U.S. Pat. No. 4,844,999.

The nickel electrode may also be prepared by pasting a mixture of carboximethylcellulose binder ("CMC"), nickel hydroxide and cobalt monoxide in a nickel foam. This pasted, foam-nickel electrode makes good electrical contact to the conductive polymeric face of the wafer cell.

EXAMPLES OF THE INVENTION

Example 1

A single cell was fabricated which consisted of one positive nickel electrode and one negative metal hydride electrode assembled in an arrangement as shown in FIG. 1. The hydride electrode was prepared by blending a mixture consisting of 45 grams of a Mischmetal hydride alloy, 0.5 grams of Teflon® powder and 4.5 grams of CuO. The Mischmetal hydride alloy used herein was comprised of an alloy of Mn $Ni_{3.5}$ $Co_{0.7}$ $Al_{0.8}$. The hydride alloy, received as about ⅛ to ¼ inch particles, was fragmented by dry pressure hydrating five times between vacuum and 200 psi to produce an average particle size of about 50 microns. The mixture was blended in a high speed blender for two 30-second periods. The mixture was then rolled out to a layer approximately 0.060 inch thick, and then folded and rolled to a 0.060 inch thickness in a direction about 90 degrees from the original direction. The above folding and rolling in the rotated direction was sequentially repeated seven times to a point wherein the Teflon® powder was fibrillated to form a fibrous, lace-like network which contained and bonded the other ingredients. For each step, the folding and rolling was carried out in a direction about 90 degrees from the folding and rolling direction of the immediately preceding step. The strip was then calendared to a final thickness of 0.020 inches. A 3×3 inch electrode, weighing 11 grams, was cut from the strip and assembled in the cell.

Figure 7A:
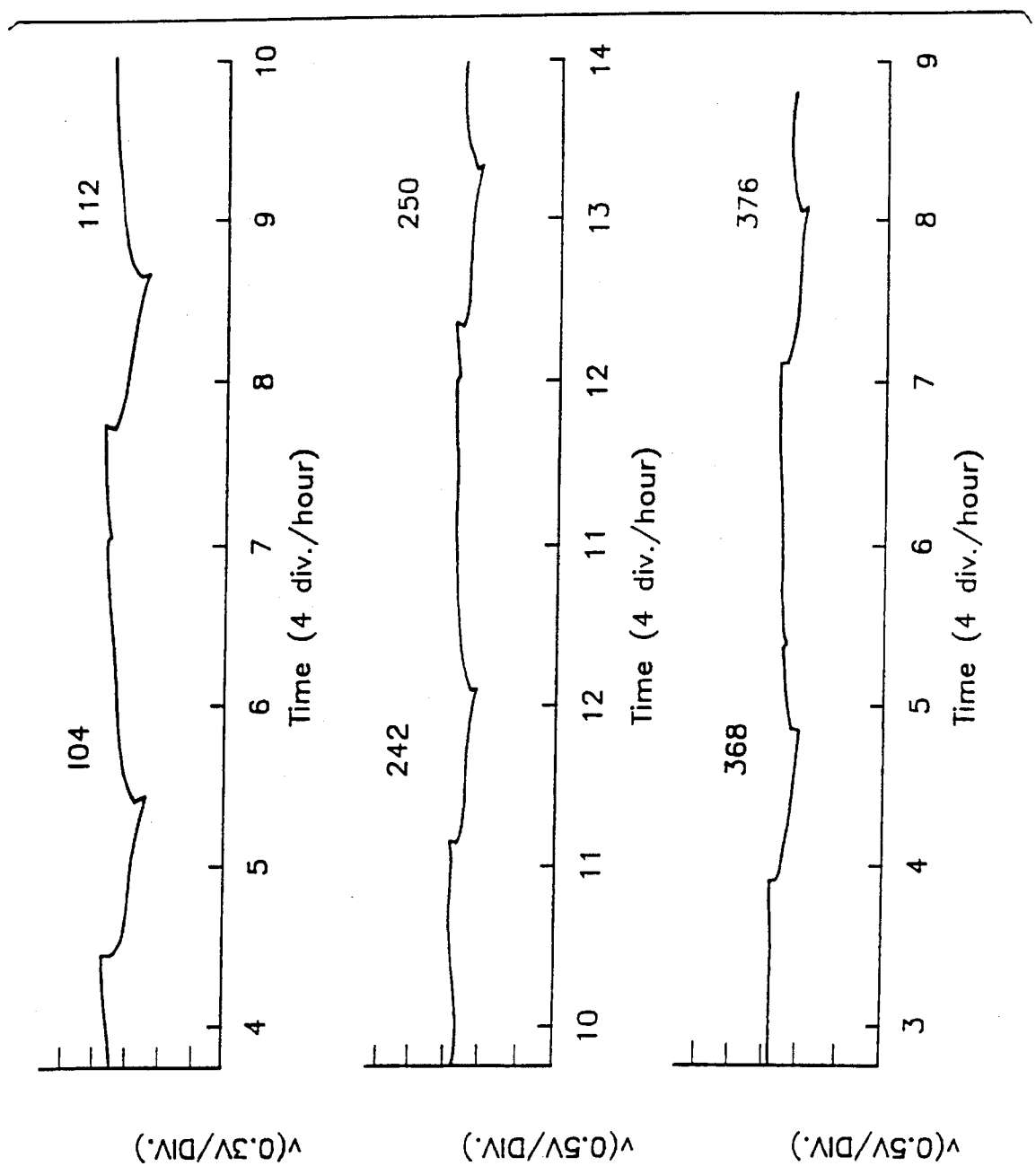
FIG. 7A shows the strip chart recording of the cell voltage of cell #113 for cycle numbers 104, 112, 242, 250, 368 and 376.
Figure 7B:
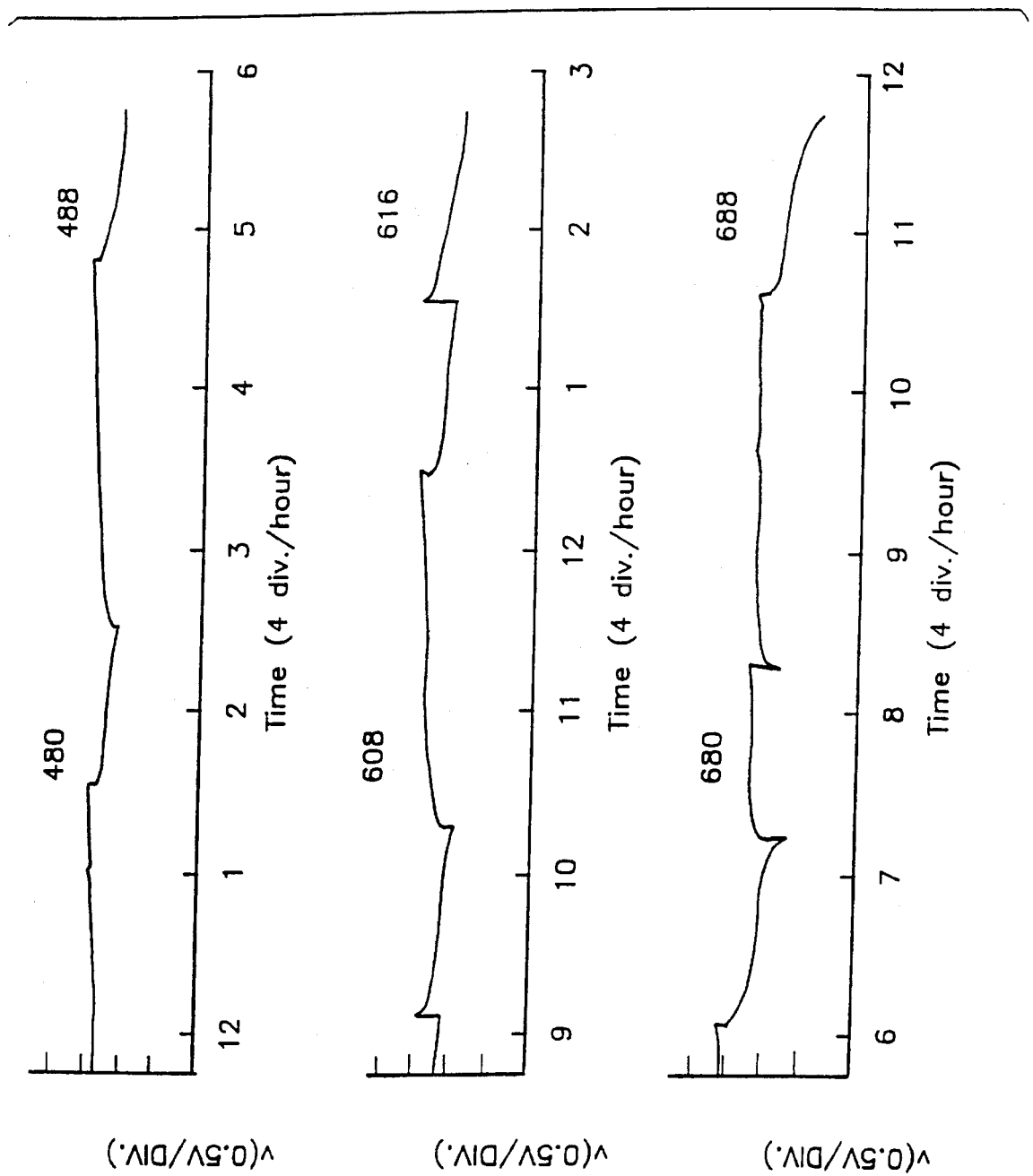
FIG. 7B shows the strip chart recording of the cell voltage of cell #113 for cycle numbers 480, 488, 608, 616, 680 and 688.

The nickel electrode was prepared using a method similar to that described for the hydride electrode. The mixture contained 1 gram of Teflon® powder, 1.5 grams of cobalt monoxide, 15 grams of graphite powder and 32.5 grams of nickel hydroxide powder. The final strip was calendared to a thickness of about 0.040 inches. A 3×3 inch electrode weighing 10 grams was cut from the strip. The electrode was then pressed at about 2,000 psi in a hydraulic press to a thickness of about 0.033 inches prior to assembly in the cell. Two layers of a non-woven nylon separator were placed between the electrodes. The outer layers of the cell were constructed from a conductive, carbon-filled polymeric film manufactured by Graphics Inc. A frame border of non-conductive vinyl polymer was sandwiched between the inner faces of the outer layers and heat sealed on three sides. Nickel foil layers with a thickness of 0.002 inches were placed on the outer faces of the outer layers. The cell assembly was then placed between two rigid acrylic plates which contained peripheral bolts to hold the assembly together. The cell was filled with 30% KOH-1% LiOH electrolyte, allowed to soak for 24 hours and then subjected to three formation cycles. A formation cycle is comprised of 15 hours charge at 150 mA and discharge at 500 mA to 0.8 volts. The cell was life tested on a three-hour cycle, corresponding to two hours of charging at about 0.55 amps and one hour of discharging at about 1 amp. Water was added to the cell to make up for losses. FIG. 7A and 7B show strip chart recordings of the cell voltage of cell #113 at periodic intervals through cycle 688. The results obtained show the cell voltages were surprisingly stable during the charge/discharge cycle for more than 500 cycles.

Example 2

Figure 8:
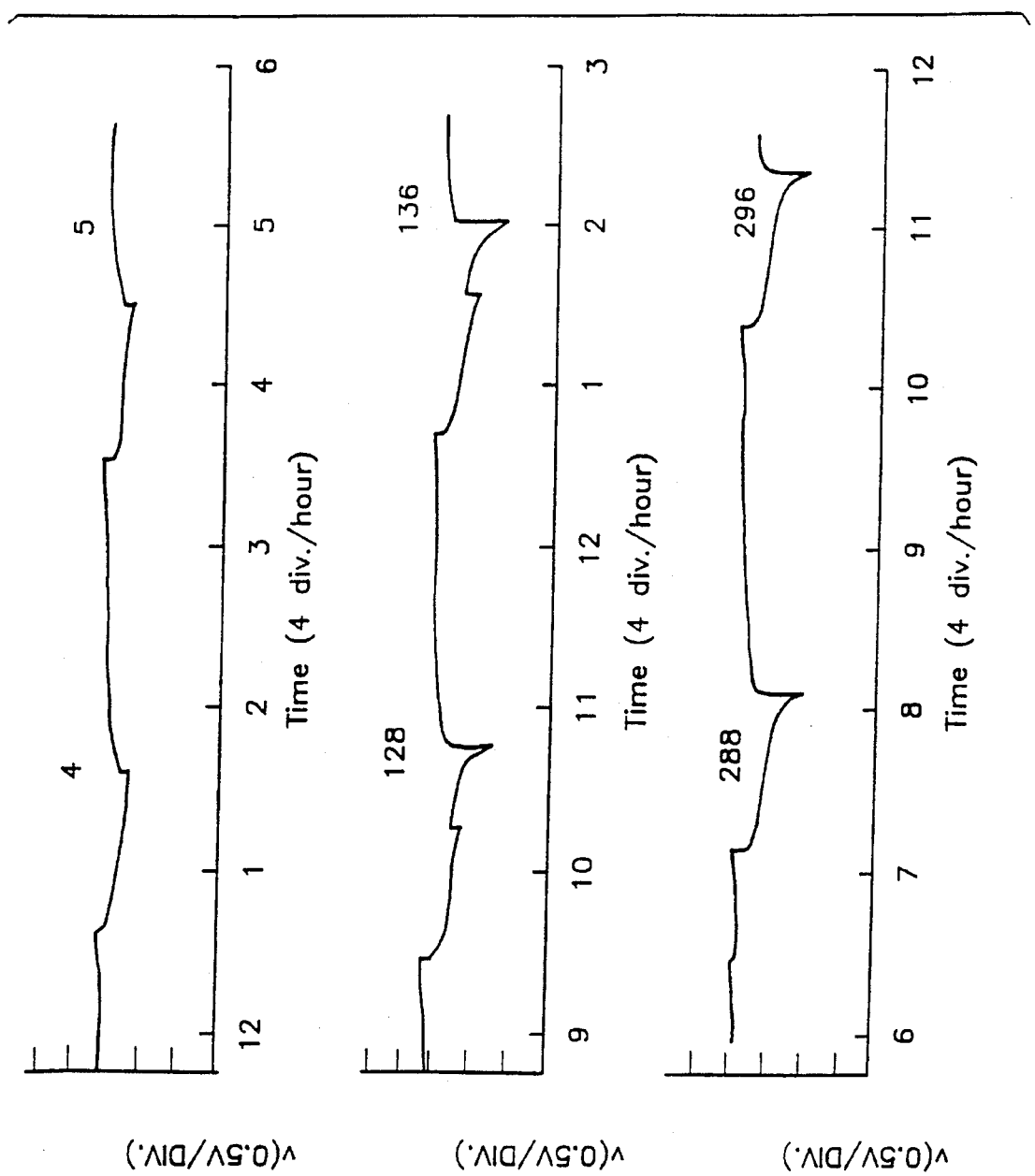
FIG. 8 shows the strip chart recording of the cell voltage of cell #121 for cycle numbers 4, 5, 128, 136, 288 and 296.

A cell was constructed as above except that the nickel electrode was of the sintered type and was obtained from a commercial supplier. The 3×3 electrode weighed 12 grams and was 0.028 inches thick. The cell was life tested and showed stable cell voltages for more than 200 cycles as shown in FIG. 8 (cell #121).

Example 3

Figure 9:
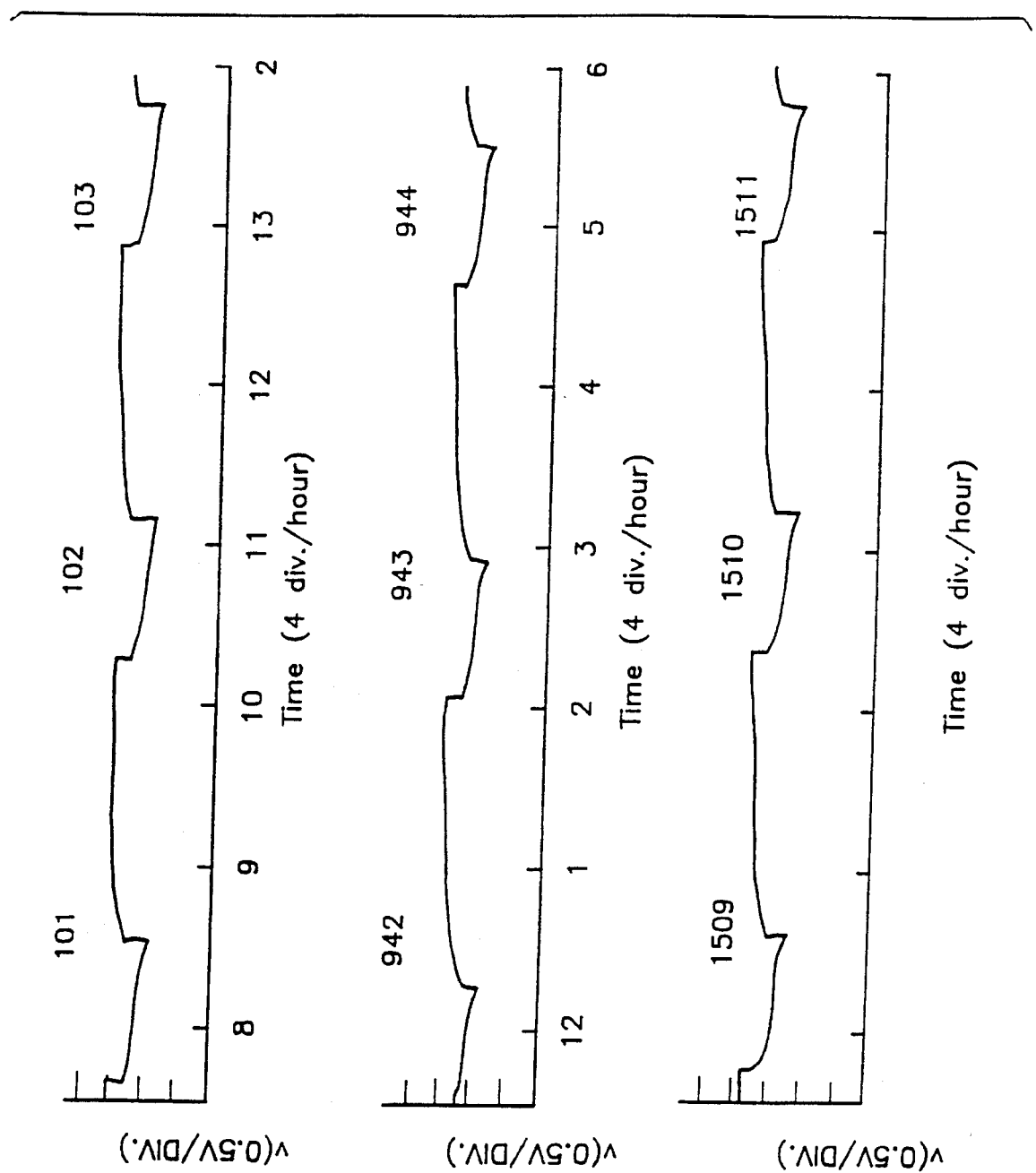
FIG. 9 shows the strip chart recording of the cell voltage of cell #144 for cycle numbers 101, 102, 103, 942, 943, 944, 1509, 1510 and 1511.

A cell was assembled as described above with the exception that the nickel electrode was of the pasted foam type and the separator was a plastic bonded inorganic pigment. Commercially available electroformed nickel foam obtained from Eltek Inc. was pasted with a mixture consisting of a 1% solution of CMC in water which had been added to a dry blended mixture of 10% cobalt monoxide and 90% nickel hydroxide. After drying, the 3×3 inch electrode was pressed to a final thickness of 0.040 inches. The finished electrode weight was 14 grams. The cell exhibited stable performance for over 1500 cycles as shown in FIG. 9 (cell #144).

Example 4

Figure 10:
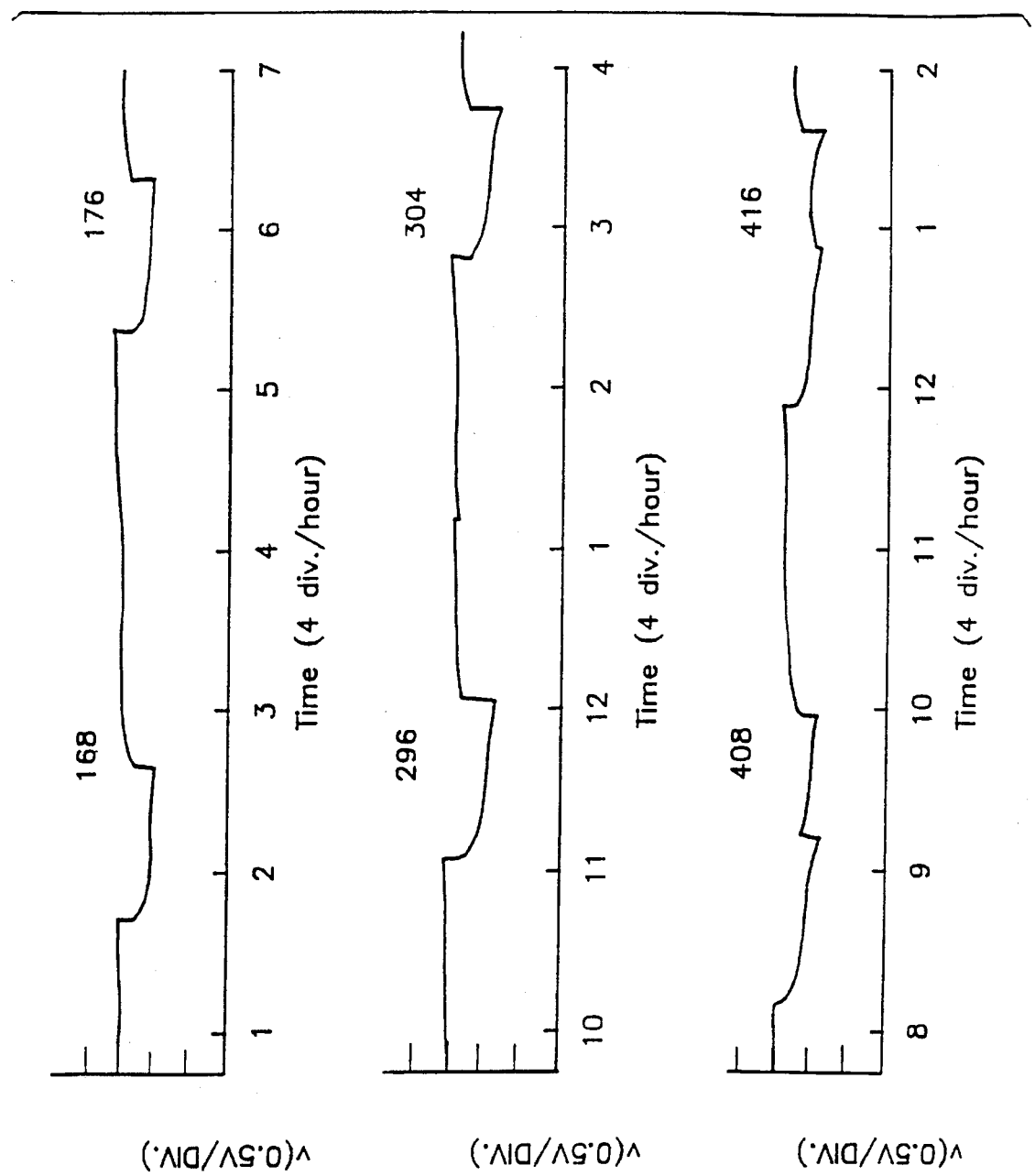
FIG. 10 shows the strip chart recording of the cell voltage of cell #134 for cycle numbers 168, 176, 296, 304, 408 and 416.

A cell was assembled as described in Example 1 with a hydride electrode comprised of 19% nickel powder (#210 powder obtained from INCO), 1% Teflon®, and 80% hydride alloy. The cell was life tested and showed stable cell voltages for more than 416 cycles as shown in FIG. 10 (cell #134).

Example 5

Figure 11:
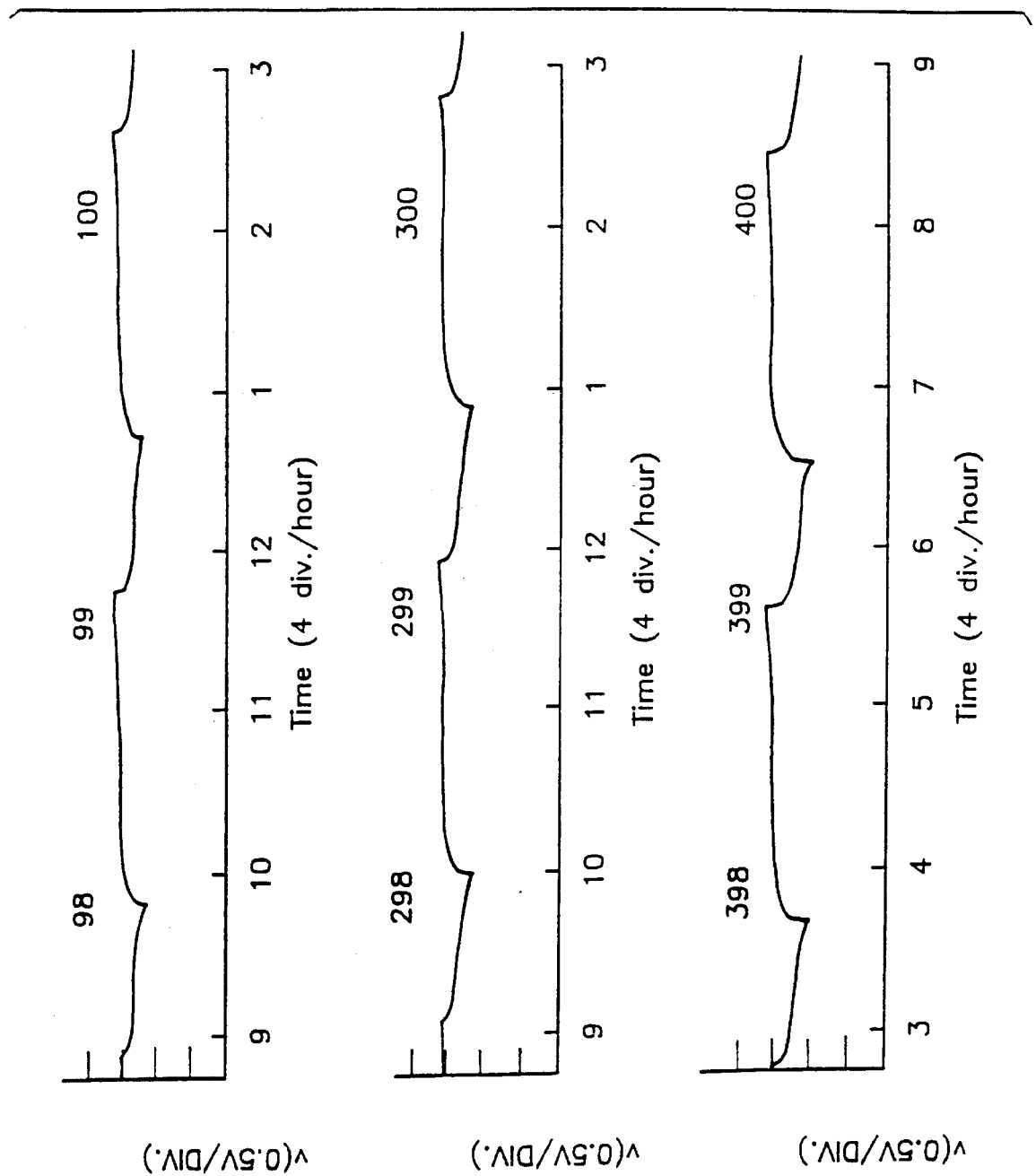
FIG. 11 shows the strip chart recording of the cell voltage of cell #170 for cycle numbers 98, 99, 100, 298, 299, 300, 398, 399 and 400.

A cell was assembled as described in Example 1 with one layer of a an inorganic composite separator material. The quantity of electrolyte was 8 cc and after the 24 hour soak period all excess free electrolyte was drained from the cell. A layer of porous, wet proofed, graphite paper was placed on the back side of the hydride electrode. The cell was assembled between two acrylic plates with a peripheral rubber gasket. The cell was contained in a sealed compartment and operated in the sealed condition. The cell was life tested and showed stable cell voltages for more than 400 cycles as shown in FIG. 11 (cell #170). A pressure gauge connected to a sensor located in the cell compartment showed no indication of pressures above 20 psi during the cycle operation.

Example 6

Figure 12:
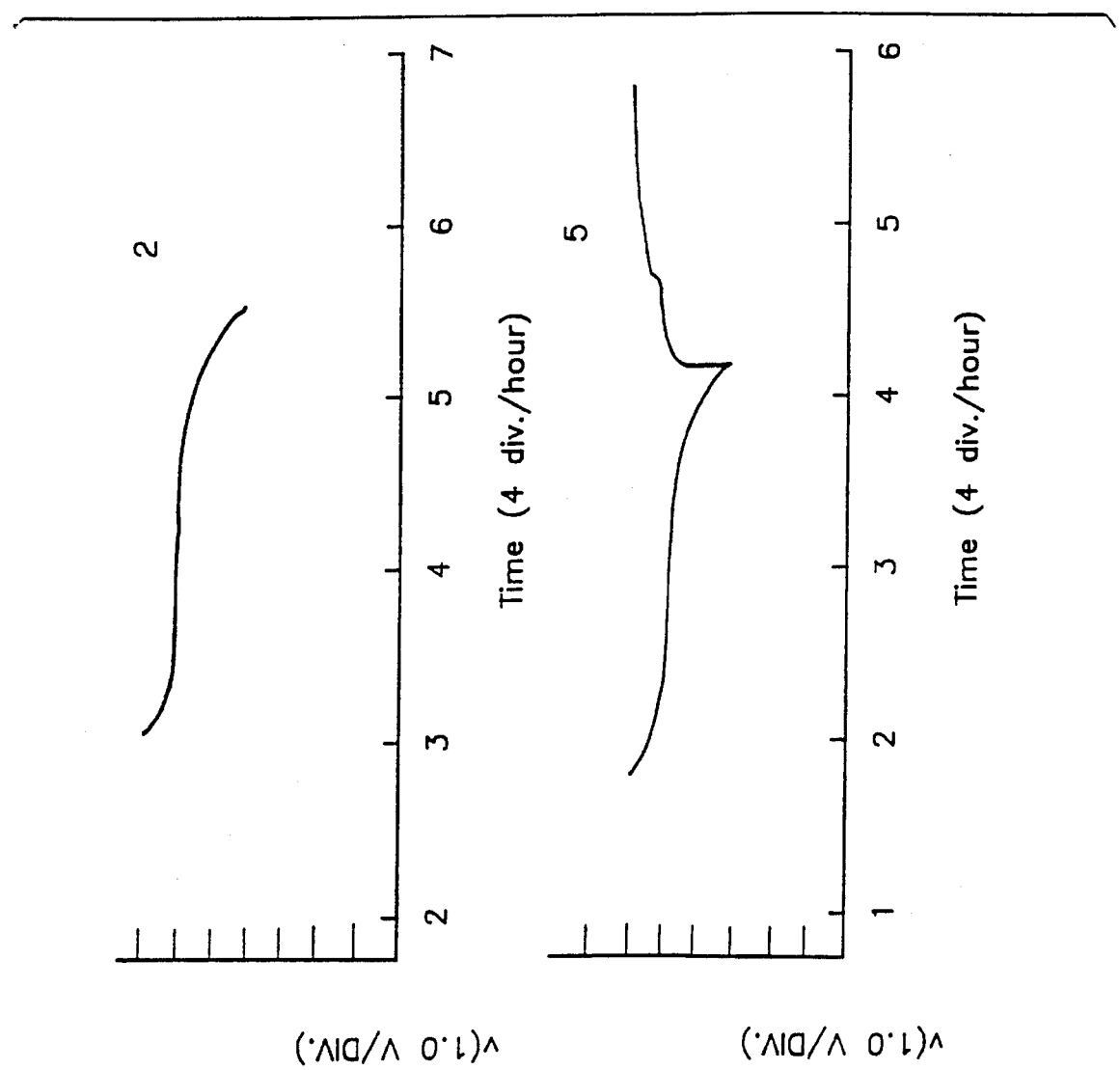
FIG. 12 shows the strip chart recording of the voltage of a stack of five cells for cycle numbers 2 and 5.

A stack of five vented cells in an arrangement as shown in FIG. 2 was assembled to make a 6 volt battery. The cell construction was similar to Example 1, except the separator was an inorganic composite material. FIG. 12 shows the discharge voltage of cycle 2 and 5.

What is claimed is:

1. A bipolar electrochemical battery comprising:
   a stack of at least two electrochemical cells electrically arranged in series wherein the adjacent cells have a positive face of one cell contacting a negative face of the adjacent cell and wherein each of said cells contains
   (a) a negative electrode;
   (b) a positive electrode;
   (c) a porous separator between said electrodes, wherein said separator contains an electrolyte;
   (d) a first electrically conductive polymeric outer layer in electrical contact with the outer face of said negative electrode; and
   (e) a second electrically conductive polymeric outer layer in electrical contact with the outer face of said positive electrode; wherein said outer layers are sealed peripherally to an electrically non-conductive polymeric material such as to form a sealed enclosure containing said electrodes, said separator and said electrolyte.

2. The bipolar electrochemical battery of claim 1 wherein said electrodes, said separator and said outer layers are each substantially flat.

3. The bipolar electrochemical battery of claim 1 wherein said negative electrode comprises cadmium.

4. The bipolar electrochemical battery of claim 1 wherein said negative electrode comprises iron.

5. The bipolar electrochemical battery of claim 1 wherein said negative electrode comprises zinc.

6. The bipolar electrochemical battery of claim 1 wherein said negative electrode is a hydrogen electrode.

7. The bipolar electrochemical battery of claim 1 wherein said negative electrode comprises an oxide or hydroxide of silver.

8. The bipolar electrochemical battery of claim 1 wherein said positive electrode comprises an oxide or hydroxide of manganese.

9. The bipolar electrochemical battery of claim 1 wherein said positive electrode comprises an oxide or hydroxide of copper.

10. The bipolar electrochemical battery of claim 1 wherein said positive electrode comprises an oxide or hydroxide of mercury.

11. The bipolar electrochemical battery of claim 1 wherein said positive electrode is an oxygen electrode.

12. The bipolar electrochemical battery of claim 1 wherein said electrically-conductive, outer layers are carbon-filled.

13. The bipolar electrochemical battery of claim 1 wherein said electrically-conductive, outer layers comprise polymeric film.

14. The bipolar electrochemical battery of claim 13 wherein said polymeric film comprises a vinyl polymer.

15. The bipolar electrochemical battery of claim 14 wherein said outer layers are heat sealed to said vinyl polymer.

16. The bipolar electrochemical battery of claim 1 wherein a conductive paste or cement is present between at least one of said outer layers and said electrode with which it is in contact.

17. The bipolar electrochemical battery of claim 12 wherein a conductive porous spacer is between said negative electrode and said conductive, carbon-filled outer layer.

18. The bipolar electrochemical battery of claim 16 wherein said porous spacer comprises porous graphite paper.

19. The bipolar electrochemical battery of claim 16 wherein the side of said negative electrode facing said porous spacer is wet proofed.

20. The bipolar electrochemical battery of claim 16 wherein the side of said negative electrode facing said porous spacer is provided with a catalyst for enhancing recombination of oxygen or hydrogen.

21. The bipolar electrochemical battery of claim 1 wherein said stack of at least two electrochemical cells is contained in a sealed battery housing.

22. The bipolar electrochemical battery of claim 20 wherein a pressure measuring device is included in said sealed battery housing.

23. The bipolar electrochemical battery of claim 20 wherein each electrochemical cell is completely sealed, wherein said battery housing contains an electrically non-conductive fluid that substantially fills the void space around said stack of cells and wherein a pressure measuring device is included in said battery housing.

24. The bipolar electrochemical battery of claim 20 wherein a conductive paste or cement is present between said cells.

25. The bipolar electrochemical battery of claim 20 wherein at least one of the end cells of said stack of cells is in contact with a metal foil, wherein said metal foil is electrically connected to a battery terminal.

26. The bipolar electrochemical battery of claim 20 wherein a conductive paste or cement is present between at least one of said end cells and said metal foil.

27. The bipolar electrochemical battery of claim 20 wherein said stack of cells is held in compression by means of tie rods that penetrate through sealed holes in the electrochemical cells.

28. The bipolar electrochemical battery of claim 20 wherein said stack of cells are held in compression by means of a layer of sponge rubber.

29. The bipolar electrochemical battery of claim 20 wherein said stack of cells are held in compression by means of a spring.

30. The bipolar electrochemical battery of claim 20 wherein said stack of cells are held in compression by means of a gas-filled compressible pad.

31. The bipolar electrochemical battery of claim 20 wherein said electrochemical cells include vent ports.

* * * * *